Figure 1:
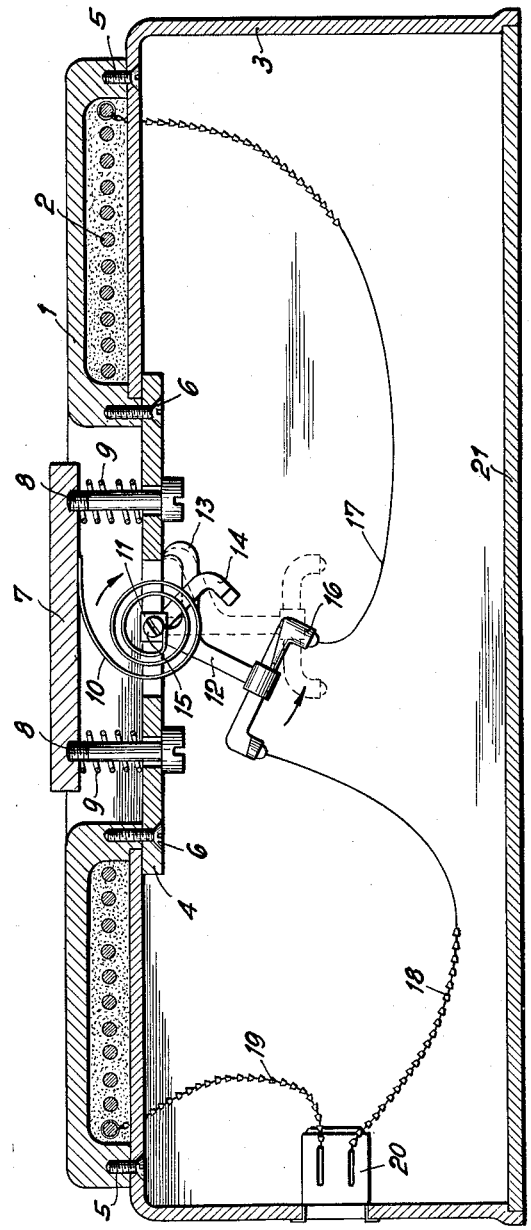

Aug. 9, 1955 F. SCHÖBERLE 2,715,176
HEATING METHOD AND APPARATUS AND CONTROL MEANS THEREFOR
Filed Feb. 2, 1953 2 Sheets-Sheet 1

INVENTOR:
FRITZ SCHÖBERLE
BY:

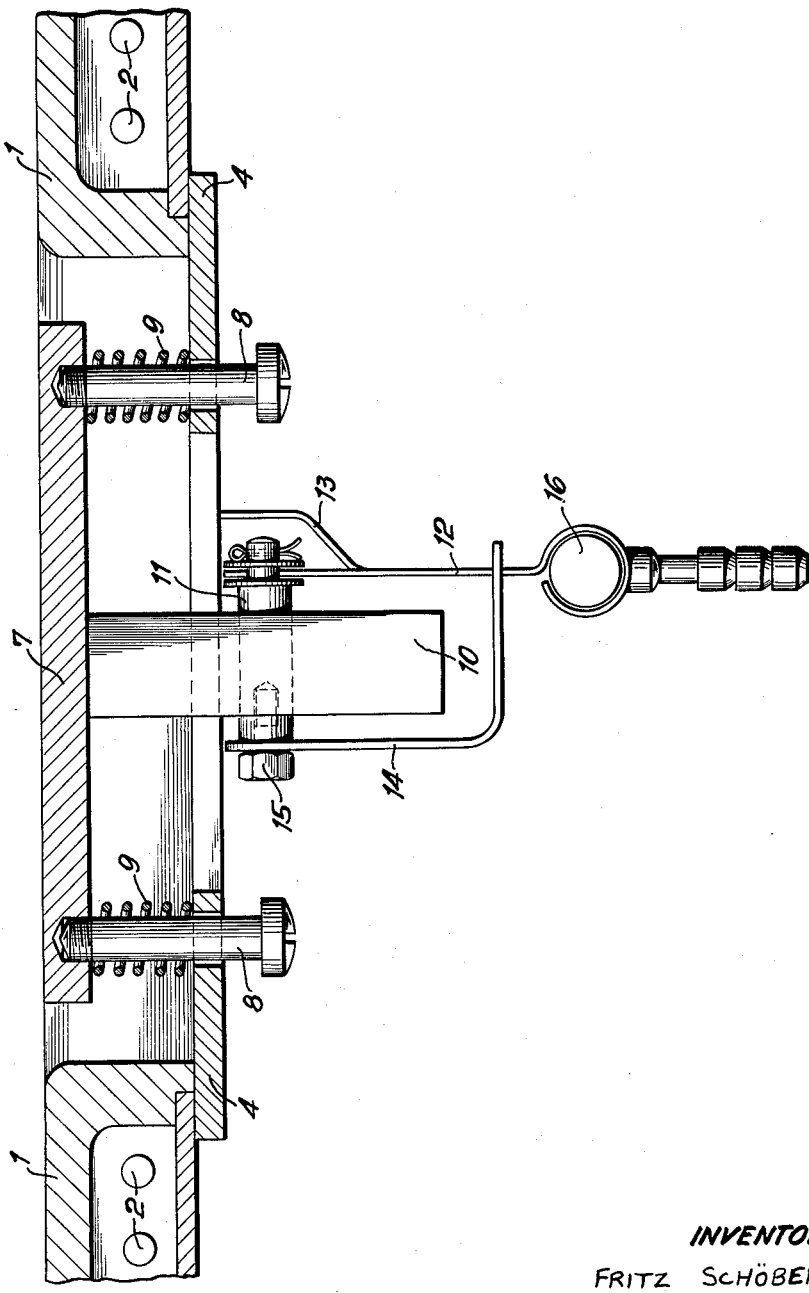

United States Patent Office 2,715,176
Patented Aug. 9, 1955

2,715,176

HEATING METHOD AND APPARATUS AND CONTROL MEANS THEREFOR

Fritz Schöberle, Hamburg, Germany

Application February 2, 1953, Serial No. 334,418

8 Claims. (Cl. 219—37)

This invention relates to a method of operating electrically heated cooking plates in which the supply of current is automatically interrupted as soon as the material treated placed on the plate has reached the requisite boiling or frying temperature, while when the temperature of the heated material falls by about 1–2° C. below the boiling or frying temperature, the circuit is automatically re-closed.

The invention also relates to a cooking plate suitable for the foregoing method, which enables the temperature of the material to be tested with the aid of a thermostat and the plate to be switched off or on by means of a switch device at the particular temperature desired.

In order to limit the boiling and frying time when using electrically heated apparatus, only adjustable time switches have hitherto been known, with the aid of which the current can be cut off completely after a desired period of time or else can be periodically interrupted at shorter or longer intervals. Electrically heated cooking plates are also known in which a temperature limiting device is incorporated beneath the cooking plate, which device protects the plate from extreme thermal load—the danger of which exists particularly when the plate is unoccupied—independently of the temperature of the material being cooked.

The present invention automatically ensures that not only is the plate protected from thermal overloads but also that the heated material is always kept only at the necessary treatment temperature, without exceeding the latter or permitting a substantial reduction thereof.

According to one embodiment of the invention, the cooking plate may be so equipped that the supply of current is interrupted when the cooking utensil is lifted off, automatically and without special switches, while the current is switched on merely by placing the saucepan or frying pan on the plate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional elevational view of an apparatus constructed in accordance with the present invention; and Fig. 2 is a sectional elevational view at right angles to that of Fig. 1 of the structure of Fig. 1 shown on an enlarged scale.

The annular cooking plate consists of an upper part in the form of annular plate 1 and a housing 3, which parts are held together by screws 5 and 6. A heating conductor 2 is embedded in a ceramic mass, in an insulated manner, in a spiral groove in the plate 1.

The heating conductor 2 is connected to a mercury switch tube 16 and with the plug socket 20 of the apparatus through current leads 17, 18 and 19. The housing 13 is closed at the bottom by a bottom plate 21.

In the circular aperture of the plate 1 is located a feeler plate 7 to which a bimetal spiral 10 is solidly secured by hard soldering or otherwise with good thermal contact, said feeler plate 7 being supported on springs 9 and on a plate 4. The inner end of the spiral 10 is rigidly joined to a square bolt 11. A pendulum 12 having an integral lateral arm 13 is suspended either in a circular groove in the square bolt 11 or on a cylindrical free end of square bolt 11 between two washers, as shown in Fig. 2, in such manner as to be freely movable. The pendulum 12 carries the mercury switch tube 16.

When no saucepan or frying pan is standing on the cooking plate, the feeler plate 7 projects upwardly beyond the plate 1. A snout on the lateral arm 13 then strikes against the plate 4 and forces the pendulum 12 into the inclined position (switched-off position).

If a pan is placed on the cooking plate, the feeler plate 7 and with it the pendulum 12 are depressed; the snout of the side arm 13 no longer strikes against the plate 4 and the pendulum passes into the vertical or switched-on position shown in broken lines.

During cooking, the feeler plate 7 transmits the amount of heat received by it from the air space surrounding it to the cooking utensil. As the temperature of the material being cooked rises, the heat drop between the cooking utensil and the feeler plate declines and an accumulation of heat occurs beneath the feeler plate which opens up the bimetal spiral 8 and causes the square bolt to turn in a clockwise direction. A motion transmitting member of driver 14 is rigidly joined to the square bolt 11.

When the boiling temperature is reached, the driver 14 strikes on the pendulum 12 and brings the latter into the inclined position illustrated, with the result that the switch tube 16 breaks the circuit.

When the temperature of the material being cooked falls by about 1 to 2° C. the bimetal spiral closes up again and the driver 14 frees the pendulum again. The pendulum 12 returns into the vertical position and hence the current is switched on again.

When the temperature loss has been made up again, the switching-on cycle is repeated. When the pan is lifted off, the feeler plate springs up. Through the striking of the snout of the side arm 13, the pendulum 12 is brought back into the switched-off position.

By the loosening of the screw 15, the rigid connection between the square bolt 11 and the driver 14 can be temporarily broken and the latter brought into a different inclined position and then re-secured. The switching-off can thus also be effected at any desired temperature of the material being treated, i. e., for other purposes than boiling or frying.

In the drawing the plate is illustrated as a single cooking plate. It can however also be constructed as a plug-in plate.

With the aid of the hereindescribed device it is possible reliably to avoid any overheating of the material being cooked, since in the presence of water the current is switched on and off at the boiling temperature, i. e., at 100° C. in the case of boiling. When heating fat, such as occurs in frying, however, the current is interrupted, as has been revealed by many series of experiments, only at about 160 to 170° C. without the switch mechanism having to be displaced in any way. The reason for this, at first sight surprising fact, is as follows:

The feeler plate and the bimetal spiral connected thereto with good thermal contact are surrounded by air the temperature of which, although below the temperature of the cooking plate, is nevertheless above the temperature of the material being cooked. There is thus always a drop in temperature between the feeler plate and the cooking utensil, so that a flow of heat takes place between the two.

It is generally known that at the beginning of the process of boiling water, air and steam bubbles form on the bottom of the utensil, whereby the coefficient of heat transfer between the bottom of the utensil and the material being cooked recedes from about 500 heat units per °C. per square metre per hour, to about 10 heat units per °C. per square metre per hour, with the result that the heat supplied by the feeler plate can be transferred to the cooking utensil only to a greatly reduced extent. The further consequence is a rapid accumulation of heat and hence rapid response of the bimetal spiral.

In the presence of fat, the circumstances are fundamentally the same, but as fat conducts heat to a considerably lesser extent than does water, the air and steam bubbles on the bottom of the utensil and hence the accumulation of heat in the feeler plate take place substantially below the boiling temperature of fat, which is generally about 280° C. in fact at about 160 to 170° C. as has been shown by experiments, which is a temperature entirely adequate for frying operations but which dependably precludes the burning of the material being cooked.

The heat accumulation effecting the switching off operation thus occurs in the presence of fat only at a temperature of the material being cooked of about 160 to 170° C.

The surprising fact thus results that both in boiling and in frying, the temperature of the material being cooked is always kept, when using the hereindescribed heating plate, within the limits of temperature which are most favorable for the operation aimed at.

Experiments have proved that even sensitive food, such as milk, rice milk puddings, porridge in milk, and meat, suffer no loss of taste when left for hours on the switched-on cooking plate unattended. In longer cooking processes, for example in the cooking of legumes, a saving in current of up to 35% can be achieved in the cooking stage with the aid of the new plate.

Because of its automatic interruption of the current in good time the heating plate of the present invention can be designed for a greater electrical load than the standard usual hitherto in cooking plates, and the heating up stage can moreover be substantially accelerated with the aid of said plate.

It is obvious that the cooking plate described, which prevents the food cooked from being spoiled, completely precludes damage to the cooking utensil or to the plate itself, because temperatures far above the switching-off temperature would be required to do such damage.

The plate is furthermore characterized by the result, achieved by means of many series of experiments, that even if the mechanical switching device (4, 12, 13) does not operate properly, the plate is automatically switched off when unoccupied or if the cooking utensil is seated extremely badly, even before the plate itself has reached a temperature of about 300 to 400° C. This result is due to the face that the feeler plate, when unloaded, gives up the heat to the air only very sluggishly, and hence the accumulation of heat which brings about the switching-off, occurs very rapidly.

What is claimed as new and desired to be secured by Letters Patent is:

1. Heating apparatus comprising, in combination, a support; electrical heating means located on said support and having a free top face against which a subject to be heated is placed; a plate mounted on said support adjacent said heating means for substantially vertical movement upwardly to and downwardly from a rest position where said plate is located above the level of said top face of said heating means; a switch located in the circuit of said heating means and being movable between closed and open positions for turning said heating means on and off, respectively; a pendulum connected to said switch for moving the same between said closed and open positions thereof; an arm fixed to said pendulum and engaging a stationary part of said support; and connecting means interconnecting said pendulum and plate for vertical movement together and supporting said pendulum for free swinging movement so that upon movement of said plate said arm co-operates with said stationary part of said support for swinging said pendulum to operate said switch.

2. Heating apparatus comprising, in combination, a support, electrical heating means located on said support and having a free top face against which a subject to be heated is placed; a plate mounted on said support adjacent said heating means for substantially vertical movement upwardly to and downwardly from a rest position where said plate is located above the level of said top face of said heating means; a switch located in the circuit of said heating means and being movable between closed and open positions for turning said heating means on and off, respectively; a pendulum connected to said switch for moving the same between said closed and open positions thereof; an arm fixed to said pendulum and engaging a stationary part of said support; connecting means interconnecting said pendulum and plate for vertical movement together and supporting said pendulum for free swinging movement so that upon movement of said plate said arm co-operates with said stationary part of said support for swinging said pendulum to operate said switch, said connecting means being in the form of a bimetallic spiral strip connected at one end to said plate and a pin fixedly connected to an opposite end of said strip and turnably supporting said pendulum; and a motion transmitting member fixedly connected to said pin and having a free end located adjacent said pendulum to turn the latter when said pin turns upon expansion of said spiral strip.

3. Heating apparatus comprising, in combination, a support; electrical heating means located on said support and having a free top face against which a subject to be heated is placed; a plate mounted on said support adjacent said heating means for substantially vertical movement upwardly to and downwardly from a rest position where said plate is located above the level of said top face of said heating means; a switch located in the circuit of said heating means and being movable between closed and open positions for turning said heating means on and off, respectively; a pendulum connected to said switch for moving the same between said closed and open positions thereof; an arm fixed to said pendulum and engaging a stationary part of said support; connecting means interconnecting said pendulum and plate for vertical movement together and supporting said pendulum for free swinging movement so that upon movement of said plate said arm co-operates with said stationary part of said support for swinging said pendulum to operate said switch, said connecting means being in the form of a bimetallic spiral strip connected at one end to said plate and a pin fixedly connected to an opposite end of said strip and turnably supporting said pendulum; and a motion transmitting member adjustably connected to said pin and having a free end located adjacent said pendulum to turn the latter when said pin turns upon expansion of said spiral strip.

4. Heating apparatus comprising, in combination, a support, electrical heating means located on said support and having a free top face against which a subject to be heated is placed; a heat conductive plate mounted on said support adjacent said heating means for substantially vertical movement upwardly to and downwardly from a rest position where said plate is located above the level of said top face of said heating means; a switch located in the circuit of said heating means and being movable between closed and open positions for turning said heating means on and off, respectively; a pendulum connected to said switch for moving the same between said closed and open positions thereof; an arm fixed to said pendulum and engaging a stationary part of said support; connecting means interconnecting said pendulum and plate for vertical movement together and supporting said pendulum for free swinging movement so that upon movement of said plate said arm co-operates with said stationary part of said support for swinging said pendulum to operate said switch, said connecting means being in the form of a bimetallic spiral strip connected at one end to said plate and a pin fixedly connected to an opposite end of said strip and turnably supporting said pendulum; and a motion transmitting member fixedly connected to said pin and having a free end located adjacent said pendulum to turn the latter when said pin turns upon expansion of said spiral strip.

5. Heating apparatus comprising, in combination, a support; electrical heating means located on said support and having a free top face against which a subject to be heated is placed; switch means located in the circuit of said heating means and being movable between closed and open positions for respectively turning said heating means on and off; a heat conductive plate located on said support adjacent said heating means; a bimetallic spiral strip fixedly connected at one end to said plate; a pin fixedly connected to an opposite end of said strip; a pendulum turnably carried by said pin for free swinging movement and being operatively connected to said switch means for moving the same between said closed and open positions thereof; and a motion transmitting member fixed to said pin and having a free end located opposite an intermediate part of said pendulum for engaging the latter upon expansion of said strip to turn said pendulum and operate said switch means.

6. Heating apparatus comprising, in combination, a support; electrical heating means located on said support and having a free top face against which a subject to be heated is placed; switch means located in the circuit of said heating means and being movable between closed and open positions for respectively turning said heating means on and off; a heat conductive plate located on said support adjacent said heating means; a bimetallic spiral strip fixedly connected at one end to said plate; a pin fixedly connected to an opposite end of said strip; a pendulum turnably carried by said pin for free swinging movement and being operatively connected to said switch means for moving the same between said closed and open positions thereof; and a motion transmitting member adjustably connected to said pin and having a free end located opposite an intermediate part of said pendulum for engaging the latter upon expansion of said strip to turn said pendulum and operate said switch means.

7. Heating apparatus comprising, in combination, a support; electrical heating means located on said support and having a free top face against which a subject to be heated is placed; switch means located in the circuit of said heating means and being movable between closed and open positions for respectively turning said heating means on and off; a heat conductive plate located on said support adjacent said heating means; a bimetallic spiral strip having inner and outer ends and being fixedly connected at its outer end to said plate; a pin fixedly connected to said inner end of said strip; a pendulum turnably carried by said pin for free swinging movement and being operatively connected to said switch means for moving the same between said closed and open positions thereof; and a motion transmitting member fixed to said pin and having a free end located opposite an intermediate part of said pendulum for engaging the latter upon expansion of said strip to turn said pendulum and operate said switch means.

8. Heating apparatus comprising, in combination, a support; annular electrical heating means located on said support and having a free top face against which the subject to be heated is placed; switch means located in the circuit of said heating means and being movable between closed and open positions for respectively turning said heating means on and off; a heat conductive plate located on said support and being surrounded by said annular heating means; a bimetallic spiral strip fixedly connected at one end to said plate; a pin fixedly connected to an opposite end of said strip; a pendulum turnably carried by said pin for free swinging movement and being operatively connected to said switch means for moving the same between said closed and open positions thereof; and a motion transmitting member adjustably connected to said pin and having a free end located opposite an intermediate part of said pendulum for engaging the latter upon expansion of said strip to turn said pendulum and operate said switch means.

References Cited in the file of this patent

UNITED STATES PATENTS

| | | |
|---|---|---|
| 1,064,358 | Mettler | June 10, 1913 |
| 1,637,155 | Marsden | July 26, 1927 |
| 2,016,358 | Blackmun et al. | Oct. 8, 1935 |
| 2,303,012 | Weber et al. | Nov. 24, 1942 |

FOREIGN PATENTS

| | | |
|---|---|---|
| 676,879 | France | Nov. 29, 1929 |